O. C. ROOS.
APPARATUS FOR DETERMINING THE DIRECTION OF SPACE TELEGRAPH SIGNALS.
APPLICATION FILED APR. 15, 1909.

984,108.

Patented Feb. 14, 1911.

2 SHEETS—SHEET 1.

UNITED STATES PATENT OFFICE.

OSCAR C. ROOS, OF CAMBRIDGE, MASSACHUSETTS.

APPARATUS FOR DETERMINING THE DIRECTION OF SPACE-TELEGRAPH SIGNALS.

984,108.

Specification of Letters Patent.   Patented Feb. 14, 1911.

Application filed April 15, 1909. Serial No. 490,135.

*To all whom it may concern:*

Be it known that I, OSCAR C. ROOS, a citizen of the United States, and a resident of Cambridge, in the county of Middlesex and State of Massachusetts, have invented a new and useful Improvement in Apparatus for Determining the Direction of Space-Telegraph Signals, of which the following is a specification.

My invention relates to improvements in apparatus for determining the direction of space telegraph signals, and its object is to provide such apparatus whereby the direction from which the electromagnetic waves emanate may be determined without changing the position of the elevated receiving conductors relatively to the direction of motion of said waves as is necessary in employing the apparatus set forth in patent to Stone No. 716,135, dated Dec. 16, 1902.

In carrying out my invention I employ two separated elevated receiving conductors, the separation thereof having no relation to the length of the waves to be received, means such as an artificial line or slow-spaced circuit in one or both of said elevated conductors for compensating for the phase difference between the oscillations in said elevated conductors, and a receiving circuit associated with said elevated conductors.

The drawings which accompany and form a part of this specification represent in diagrammatic form several systems embodying the principle of my invention.

Figure 1:
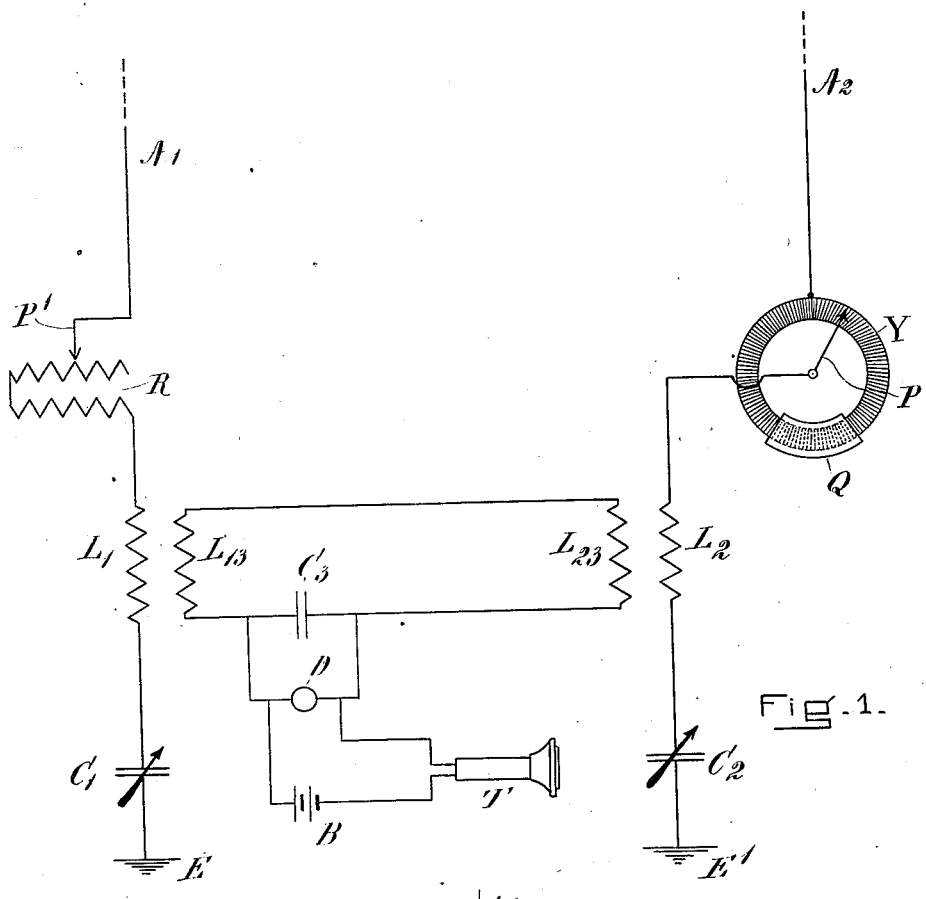
Figure 3:
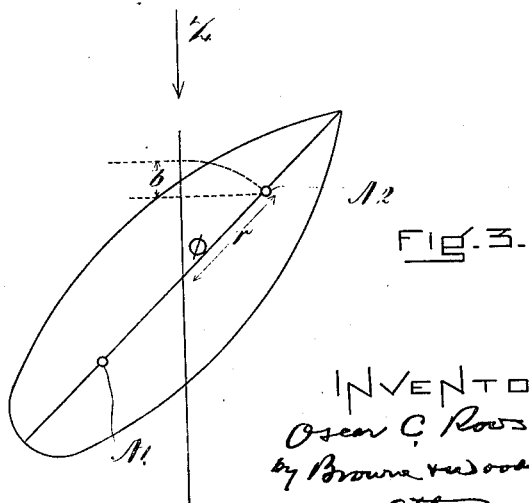
Figure 2:
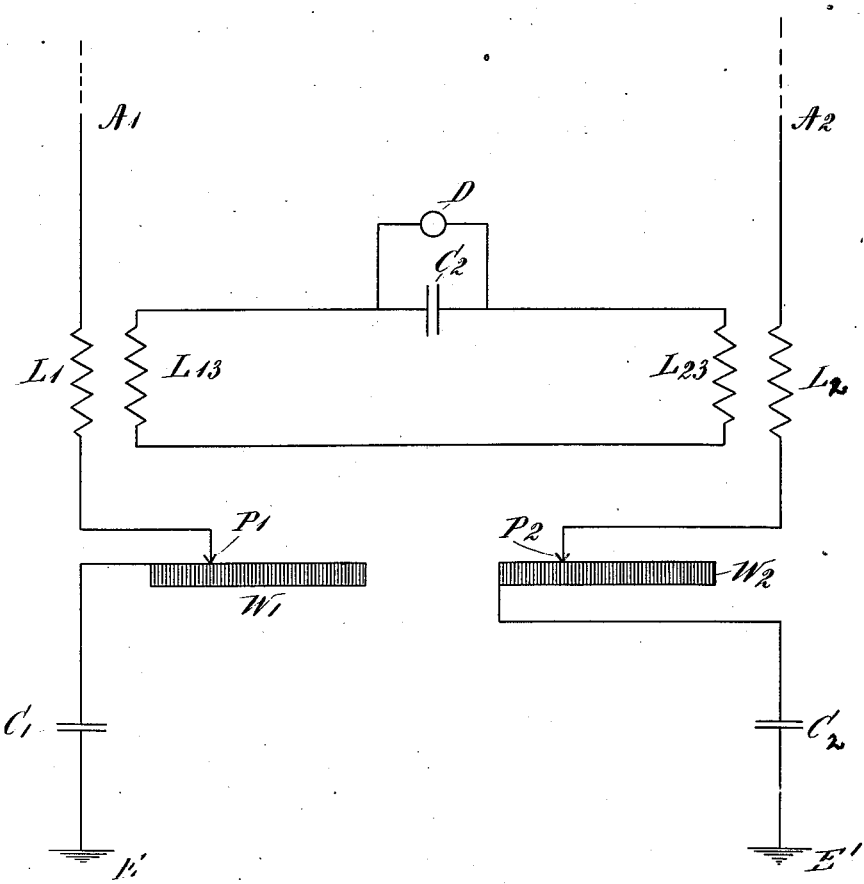

In the drawings, Figure 1 is a diagram representing a direction finder system employing one artificial line or slow-speed circuit, Fig. 2 represents a similar system employing two slow-speed circuits, and Fig. 3 is a diagram representing a ship provided with two antennæ and employed for more fully explaining the theory of my invention.

In the figures, $A_1$ $A_2$ are antennæ.

E E' are earth connections.

$C_1$ $C_2$ are condensers for changing the periods of the antennæ.

$L_1$ is the primary of a transformer of which the secondary is $L_{13}$.

$L_2$ is a primary of a transformer of which the secondary is $L_{23}$.

$C_3$ is a condenser for tuning the receiving circuit which includes the secondaries above mentioned.

D is an oscillation detector, B is a battery, and T is a signal-indicating device such as a telephone receiver.

R is a non-inductive resistance and P' is a variable contact.

Y is a toroidal cymometer, having distributed capacity and inductance and constituting an artificial line or slow-speed circuit.

$W_1$ $W_2$ are straight cymometers each having distributed capacity and inductance and constituting an artificial line or slow-speed circuit. P $P_1$ $P_2$ are variable contacts coöperating with said cymometers.

It will be understood that I do not limit myself to the particular types of artificial lines shown in the accompanying drawings, and that any suitable form of slow-speed conductor may be employed.

The operation is as follows: When electromagnetic waves emanating from a distant point impinge upon the receiving conductors the difference in phase between the oscillations developed by said waves in the receiving conductors can be compensated for by varying the position of the pointer P (in the system shown in Fig. 1) and the pointers $P_1$ $P_2$ (in the system shown in Fig. 2) and when the response of the receiver T thereby is rendered zero or reduced to a minimum, the bearing of the ship with respect to the point from which the waves are transmitted may be read by means of a suitably calibrated scale. In the case of Fig. 1, the noninductive resistance R may be varied to assist in compensating for the differences in phase above mentioned. This adjustment is required because of the variation of the effective maximum potential applied to the secondary $L_{23}$ which is caused by the variation of the resistance in the coil Y by moving the pointer P. The condition that the point of attachment of $L_2$ to the coil Y will not have the same potential as that of $L_1$ to the resistance R on account of the sinusoidal distribution of potential along the coil Y can be compensated by changing the coupling between $L_1$ and $L_{13}$, or the coupling between $L_2$ and $L_{23}$.

The "dead" wire in Y at any instant may lessen the accuracy of the apparatus unless means are provided for obviating said effect by short-circuiting such dead wire as by the sliding iron or iron-plated sector Q.

In the system shown in Fig. 2 the slow-speed circuits $W_1$ $W_2$ if identical should be so calibrated that the movements of the contact makers $P_1$ and $P_2$ are exactly equal so that the resistances in the circuits are therefore equal.

Referring to Fig. 3 in which Z represents the direction of motion of the waves, $r$ one-half the separation of the antennæ and $$b = r \text{ versine } \phi,$$

it will be seen that $$\theta = 4\pi nr \text{ versine } \phi$$

represents the phase difference of the oscillations in the antennæ in radians, and it follows therefore that $$\phi = \text{versine} \frac{-1v\theta}{4\pi nr}$$

gives the angle made between the line joining the antennæ and the line Z if the system as a whole be so adjusted that $$\theta = 0 \text{ when } \phi = 0,$$

$v$ and $n$ in the above expressions representing respectively the velocity of electric propagation and the frequency of the waves. Inasmuch as $\Theta$ may be expressed in terms of the positions of the several contacts P, it follows that the cymometers or other slow-speed conductors can be provided with scales on which the angle $\phi$ or the desired bearing of the ship with respect to a distant source may be read directly.

I claim:

1. An apparatus for determining the direction of space telegraph signals comprising two separated elevated receiving conductors, means in each of said conductors for compensating for phase difference between the oscillations in each elevated conductor, a receiving circuit associated with each elevated conductor, and an oscillation detector associated with said receiving circuit.

2. An apparatus for determining the direction of space telegraph signals comprising two separated elevated receiving conductors, means in one of said elevated receiving conductors for compensating for phase difference between the oscillations in each elevated conductor, a receiving circuit associated with each elevated conductor, and an oscillation detector associated with said receiving circuit.

In testimony whereof, I have hereunto subscribed my name this 10 day of April 1909.

OSCAR C. ROOS.

Witnesses:
E. B. TOMLINSON,
GEO. K. WOODWORTH.

---

It is hereby certified that in Letters Patent No. 984,108, granted February 14, 1911, upon the application of Oscar C. Roos, of Cambridge, Massachusetts, for an improvement in "Apparatus for Determining the Direction of Space-Telegraph Signals," errors appear in the printed specification and in the drawings requiring correction as follows: Page 1, line 25, the word "spaced" should read *speed;* page 2, line 6, the equation "$\theta = 4\pi nr$ versine $\phi$" should read $\Theta = \frac{4\pi nr \text{ versin } \phi}{v}$; and same page, line 13, the equation "$\phi = \text{versin}_e \frac{-1v\theta}{4\pi nr}$" should read $\phi = \text{versin}^{-1} \frac{v\Theta}{4\pi nr}$; and in the drawings, sheet 2, Fig. 2, condensers $C_1$ and $C_2$, arrows should be inserted, as in Fig. 1; and that the said Letters Patent should be read with these corrections therein that the same may conform to the record of the case in the Patent Office.

Signed and sealed this 14th day of March, A. D., 1911.

[SEAL.]

E. B. MOORE,
*Commissioner of Patents.*